Patented Sept. 2, 1924.

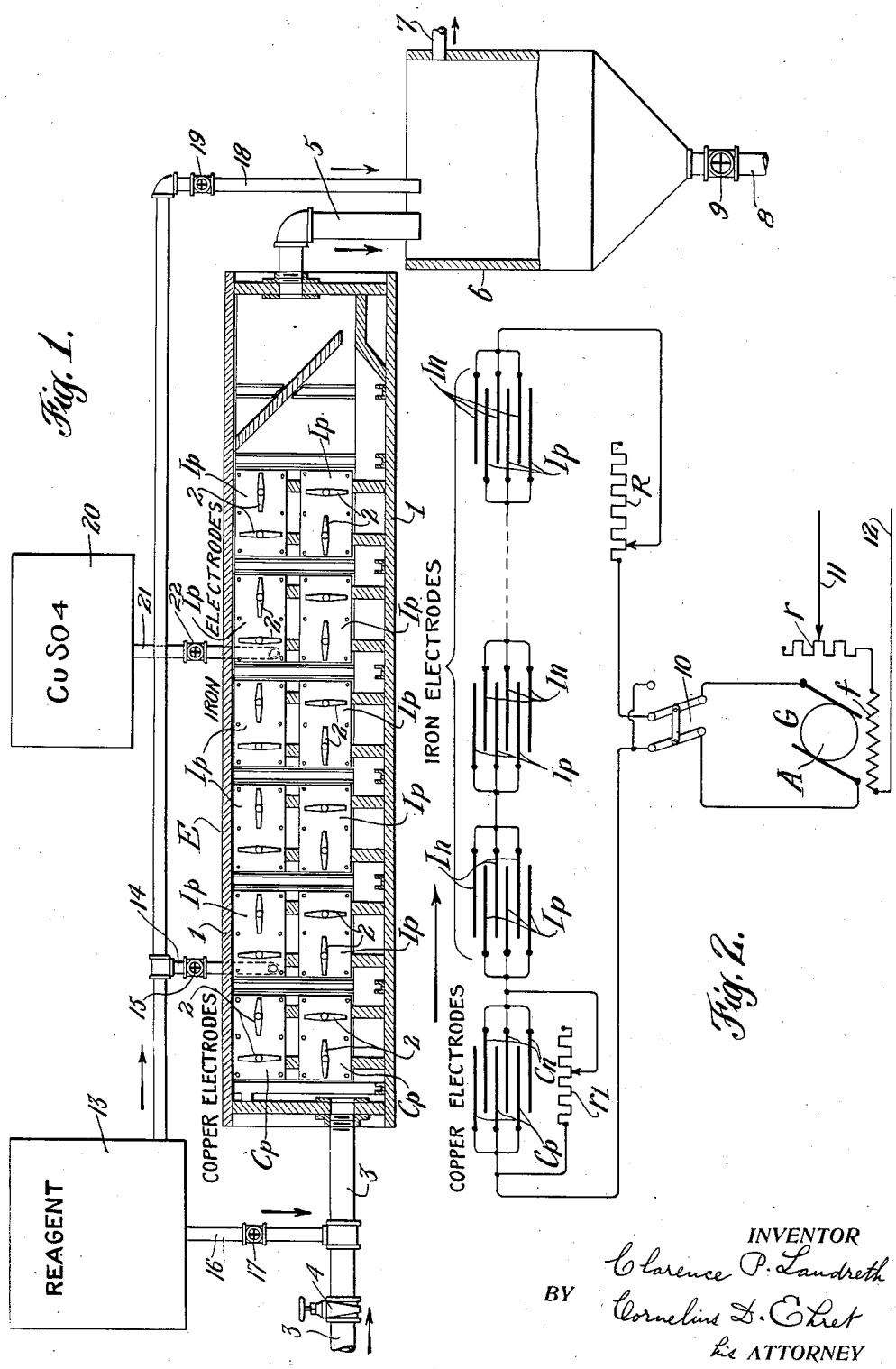

1,507,121

UNITED STATES PATENT OFFICE.

CLARENCE P. LANDRETH, OF PHILADELPHIA, PENNSYLVANIA.

ELECTROCHEMICAL TREATMENT OF LIQUIDS.

Application filed April 6, 1923. Serial No. 630,208.

*To all whom it may concern:*

Be it known that I, CLARENCE P. LANDRETH, a citizen of the United States, residing in the city and county of Philadelphia, State of Pennsylvania, have invented certain new and useful Improvements in Electrochemical Treatment of Liquids, of which the following is a specification.

My invention relates to electro-chemical treatment of liquids, such as sewage, effluents from slaughter houses, tanneries and the like, factory waste, etc., waters, such as are intended for industrial and potable purposes, and the like, for effecting desired chemical or physical changes, or both.

In accordance with my invention, electric current is passed through the liquid between electrodes to effect suitable chemical or physical changes, or both, the liquid coming first into co-operative relation with an electrode or electrodes of copper, alloy of copper or equivalent material which, by simple chemical action with a content of the liquid, or by the action of the current, or both, causes formation of a compound or compounds of copper or equivalent, either soluble or insoluble in the liquid, with the result that the germicidal effects of copper or copper compounds are procured, and, in addition and principally, the compounds of copper or equivalent prevent or lessen the adhesion of solids upon the electrodes with which the liquid later comes into co-operative relation, particularly when those electrodes, and more particularly the positive electrodes, are of iron, steel or equivalent, especially when the nature of electrical treatment is such that the current is passed through the liquid in the presence of free alkali, as hydroxide of calcium, sodium, etc.

My invention resides in the method and apparatus of the character hereinafter described.

For an understanding of my method, and for an illustration of one of various forms of apparatus embodying my invention, reference is to be had to the accompanying drawing, in which:

Fig. 1 is an elevational view, partially in vertical section, of apparatus embodying my invention and utilizable for practicing my method.

Fig. 2 is a diagrammatic view of a circuit arrangement, utilizable in accordance with my invention.

Referring to Fig. 1, E is an electrolyzer apparatus, of any suitable construction or type, and in the example illustrated is of the character shown in my prior Letters Patent No. 1,139,778. Within the tank 1 are suitably supported a plurality of groups of electrodes, between which are disposed the rotatable or movable paddles, agitators or scrapers 2 for keeping the liquid in agitation and for minimizing adhesion of materials to the electrodes, it being understood, however, that utilization of the members 2, or their equivalents, is not essential to my invention, though preferred in connection with my present invention when practiced in accordance with the process described in the aforesaid Letters Patent.

The liquid, as sewage or water, is introduced through the pipe or conduit 3, controlled by valve 4, into the tank 1, longitudinally of which it flows, between the electrodes of the different groups, and is discharged through the conduit or pipe 5 to stream or waste, or, as indicated, particularly for the case of waters further to be used, into the sedimentation tank or basin 6 in which sedimentation of any precipitates or solids takes place, the clear effluent passing off through the outlet 7, while sediment, sludge, precipitate and the like may be drawn off from time to time through the pipe 8 controlled by valve 9.

The electrodes may be arranged in any suitable way and in any suitable grouping, and the groups may be connected in circuit with a source of current in any suitable or desired arrangement.

In Fig. 2, each group of electrodes is shown as comprising a plurality of positive and negative electrodes, all the positive electrodes connected to each other and all the negative electrodes connected to each other, and the several groups connected in series with each other with a suitable source of current which, as indicated, may be a direct current generator G, whose armature A is connected through the reversing switch 10 with the electrode or electrolyzer circuit, and whose field winding $f$ may be separately excited by current delivered by the supply conductors 11 and 12, or by current from the armature A itself, in which case the conductors 11 and 12 will connect to the different armature brushes. In either case, the voltage impressed upon the system is controllable by the variable resistance $r$ for varying the field excitation. For varying the current passing between the electrodes, there may be utilized the variable resistance $R$; the latter, however, may be omitted and the control effected by the rheostat $r$.

Adjacent the liquid inlet to the tank 1 is disposed a positive electrode or electrodes $Cp$, of copper, copper alloy or equivalent, the co-acting negative electrodes $Cn$ being of any suitable material, but preferably also of copper, copper alloy or equivalent, particularly if the direction of current is to be reversed, as effectable by the reversing switch 10, in which case the negative electrodes become positive. These electrodes may be disposed in a single group, as indicated in Fig. 2, or in a plurality of groups, as indicated in Fig. 1, the number of groups or number of electrodes or electrode area being anything suitable or desirable.

After passing the aforesaid electrodes of copper or equivalent, the liquid passes one or more additional positive electrodes or groups of positive electrodes $Ip$, of any suitable material, but preferably of iron, steel or equivalent. Co-acting with these last named positive electrodes are the negative electrodes $In$, of any suitable material, but preferably of the same material as the positive electrodes $Ip$ in case the current is to be reversed, as effectable by the reversing switch 10.

In order that the strength of current flowing between the electrodes $Cp$ and $Cn$ may be graduated or varied substantially independently of the current strength flowing between the other electrodes $Ip$ and $In$, the electrodes $Cp$ and $Cn$ may be shunted by the variable resistance or rheostat $r^1$. Reducing the resistance $r^1$ in shunt to the copper or equivalent electrodes reduces the current flowing between those electrodes, and therefore reduces the amount of copper or equivalent carried by the current or by electro-chemical action into the liquid under treatment.

The liquid to be treated may have such content as will attack the electrodes $Cp$ or $Cn$ of copper, copper alloy or equivalent to produce by simple chemical action a compound, either soluble or insoluble, in the liquid. Or the liquid may have a content which in the presence of the electric current flowing between the electrodes $Cp$ and $Cn$ will cause by electrical or electro-chemical action transfer of copper or equivalent into the liquid, either in the form of a soluble or insoluble compound of copper, or equivalent.

The copper, in the form of soluble or insoluble compounds, thus formed at the expense of the material of the electrodes $Cp$ or $Cn$, operates as a germicide within the liquid during its subsequent electrical treatment, or thereafter, or both.

The principal purpose of the copper or equivalent compound or compounds is, however, to prevent or reduce adhesion upon the electrodes $Ip$ or $In$ of precipitates or solids otherwise deposited thereon from the liquid while passing them.

Furthermore, a compound of copper or equivalent soluble in the liquid may react with a content of the liquid to form a precipitate or insoluble compound of copper or equivalent, either by simple chemical action or as effected by the current passing between the electrodes $Ip$ and $In$, such precipitate serving as a germicide and as a preventive against adhesion of solids or precipitates from the liquid upon the electrodes $Ip$ or $In$.

In case the liquid contains, for example, iron compounds in solution, such compounds of copper or equivalent may be removed from the liquid by sedimentation or filtration.

The delivery into or production in the liquid of copper compound or compounds is of particular advantage in the case there is added to the liquid to be electrically treated a reagent.

In case the liquid, as sewage or water, is to receive electro-chemical treatment of the character described in the aforesaid Letters Patent, there is introduced into the liquid to be treated a suitable reagent, as alkali, and preferably free alkali, as calcium, sodium, or other hydroxide. This reagent may be contained in any suitable tank, as 13, and is preferably delivered into the tank 1 through the pipe 14, controlled by valve 15, at a point beyond the electrodes $Cp$, $Cn$, of copper or equivalent, and prior to the passage of the liquid between the last or all of the iron or other electrodes $Ip$, $In$. It shall be understood, however, that reagent may also be delivered into the liquid in advance of passing the electrodes $Cp$, $Cn$, as by introduction through the pipe 16, controlled by valve 17, to the conduit 3. Or the reagent may be introduced after the electrical treatment, particularly where sedimentation is to be effected, as through the pipe 18, controlled by valve 19, discharging into the sedimentation basin 6. Or the reagent may be introduced at any two or three of the aforesaid points or regions.

In treating sewage or water to which is added free alkali, as calcium hydroxide, from the tank 13 through the pipe 14, the liquid first passes the electrodes $Cp$ and $Cn$, and under the influence of the current passing between the electrodes $Cp$ and $Cn$, or by simple chemical action, or both, copper or equivalent will be transported into the liquid and exist therein either as a soluble or insoluble compound. For example, ammonia, generally contained in sewage and other liquids, will dissolve copper or equivalent and the compounds so formed together with possible other soluble compounds of copper produced either by chemical action alone or by the effects of the current, or both, are then thrown out of solution in the form of precipitates by the reagent, as calcium hydroxide, introduced through the pipe 14.

If the copper compounds are soluble in the liquid and remain so, iron, or equivalent, of electrodes $I_p$ or $I_n$ will replace the copper, and metallic copper will coat or tend to coat the iron or equivalent electrodes. Or if the copper compounds are insoluble in the liquid, they tend to adhere to the iron or equivalent electrodes or the surface coatings thereon, setting up a counter-effect or action to that which causes the carbonates (and) or suphates of calcium (and) or magnesium to adhere to the iron or equivalent electrodes, as is commonly the case when the copper or equivalent electrodes are absent and as may occur under such circumstances due to unskilled operation resulting in polarization (and) or the necessity of impressing a higher potential difference between electrodes of a group to ensure the passage between them of current of the desired strength such increased voltage, however, tending to decompose certain salts in the sewage or water, as, for example, sodium chloride, with a resultant decomposition causing attack upon the iron or equivalent electrodes and consumption of otherwise available and desired nascent oxygen in case the electrodes are of oxidizable material, as iron or the like. The utilization of copper as described, however, prevents or lessens the adhesion to the iron or equivalent electrodes of calcium and magnesium carbonates and sulphates, or other or equivalent solids or precipitates, with the result that the tendency to polarization is reduced or prevented and the need for increased voltage between electrodes and its undesirable results are obviated, and, in general, the operation of the process proceeds with less disturbance and annoyance, with greater regularity and uniformity, and with the added advantage of the germicidal action of copper compounds.

It is desirable that during the electrical treatment, particularly in the presence of the electrodes $I_p$ and $I_n$, there be calcium hydroxide or other free alkali present in such quantity that there remains in the liquid an excess after reaction with contents of the liquid and after converting soluble copper or equivalent compounds into insoluble compounds or precipitates, whereby the effluent from the electrolyzer contains free alkali. And in any event, it is preferred that after reaction with copper or any other compound or compounds in the liquid there be sufficient free alkali or hydroxide present in the liquid during its electrical treatment to effect production of nascent oxygen without substantial decomposition of the iron or equivalent electrodes.

The electrodes $I_p$, $I_n$ may be preliminarily coated with copper or equivalent, as before starting the electrolyzer apparatus, by introducing into the tank 1 into contact with the electrodes $I_p$, $I_n$ a solution of suitable compound of copper or equivalent, as, for example, copper sulphate, as from the tank 20, through the pipe 21 controlled by the valve 22. After the preliminary coating has been effected, the remaining solution of compound of copper or equivalent may be again withdrawn to the tank 20, or may be passed off to any other suitable destination.

For brevity in the appended claims the terms "copper" and "iron" are employed to include those materials specifically and their equivalents effecting the actions and results hereinbefore described.

What I claim is:

1. The method of treating liquid, as sewage, water, etc., which comprises introducing into the liquid a compound of copper, and thereafter passing current through the liquid in the presence of an electrode of iron.

2. The method of treating liquid, as sewage, water, etc., which comprises passing the liquid in contact with a mass of copper to effect in the liquid a compound of copper due to reaction with a content of the liquid, and thereafter passing current through the liquid in the presence of the copper compound and in the presence of an electrode of iron.

3. The method of treating liquid, as sewage, water, etc., which comprises passing current through the liquid in the presence of an electrode of copper, and thereafter passing current through the liquid in the presence of an electrode of iron.

4. In the treatment of liquid, as sewage, water, etc., by passage of current therethrough in the presence of an electrode, the method of reducing deposition of material from the liquid upon the electrode, which comprises introducing into the liquid a compound of copper.

5. In the treatment of liquid, as sewage, water, etc., by addition of hydroxide and the passage of current through the liquid in the presence of an electrode of iron, the method of reducing deposition of material from the liquid upon the electrode, which comprises introducing into the liquid a compound of copper.

6. In the treatment of liquid, as sewage, liquid, comprising groups of electrode structures of copper and iron connected in series with each other, a source of current in circuit with said groups of electrode structures, means for passing the liquid to be treated first in contact with a group of copper electrodes and thereafter in contact with the remaining electrodes, and a resistance shunting the copper electrodes.

In testimony whereof I have hereunto affixed my signatuie this 4th day of April, 1923.

CLARENCE P. LANDRETH.